United States Patent [19]

Marqués

[11] Patent Number: 4,595,329

[45] Date of Patent: Jun. 17, 1986

[54] PROCESS AND INSTALLATION FOR STORING OBJECTS WITH AUTOMATED HANDLING

[75] Inventor: Michel J. M. Marqués, Soisy-S/Montmorency, France

[73] Assignee: Cabinet Brot, Paris, France

[21] Appl. No.: 539,539

[22] Filed: Oct. 6, 1983

[30] Foreign Application Priority Data

Oct. 28, 1982 [FR] France ............................. 82 18108

[51] Int. Cl.⁴ ............................................. B65G 1/04
[52] U.S. Cl. .................................. 414/267; 198/372; 414/786
[58] Field of Search .............. 414/277, 278, 281, 495, 414/535, 786, 416, 417, 267; 198/574, 586, 372, 457, 721

[56] References Cited

U.S. PATENT DOCUMENTS

| | | | |
|---|---|---|---|
| 2,048,580 | 7/1936 | Webber | 414/498 X |
| 2,711,812 | 6/1955 | Olsen | 198/586 |
| 3,313,429 | 4/1967 | Cole | 414/522 X |
| 3,817,406 | 6/1974 | Sawada et al. | 414/279 |
| 4,051,955 | 10/1977 | Kaffka | 414/750 |
| 4,459,078 | 7/1984 | Chiantella et al. | 414/279 |

FOREIGN PATENT DOCUMENTS 2452561 6/1975 Fed. Rep. of Germany ...... 414/277

*Primary Examiner*—Robert J. Spar
*Assistant Examiner*—Stuart J. Millman
*Attorney, Agent, or Firm*—Scully, Scott, Murphy & Presser

[57] ABSTRACT

The invention provides a process and an installation for storing objects with automated handling.

The installation comprises a storage area (10) formed by a plurality of horizontal and parallel beams (14) resting on supports (18) which define therebetween and under the beams at least one longitudinal passage track extending in a direction perpendicular to the beams and at least one mechanized handling vehicle (12) adapted to move along said track, said vehicle being equipped with conveyors (86,88) for driving in a transverse direction, perpendicular to the direction of movement of the vehicle, and being adjustable in height between a low position in which it may pass freely under the beams and a high position in which the drive conveyors raise the object to be moved.

23 Claims, 16 Drawing Figures

PROCESS AND INSTALLATION FOR STORING OBJECTS WITH AUTOMATED HANDLING

BACKGROUND OF THE INVENTION

The present invention relates to storing various objects and more particularly to the storage of piles of sheets, for example made from corrugated cardboard in a packing manufacturing factory.

Reference will be made hereafter, solely for reasons of convenience, to this latter application, but it must not be lost from view that the invention applies to all kinds of fields where it is necessary to store various objects whatsoever with a view to the use or further treatment thereof.

In a factory manufacturing corrugated cardboard packings, very large areas are required for storing piles of cardboard sheets. These areas, which are generally situated between the corrugating machine and the machines for transforming the blanks, may be mechanized so that all handling of the loads is effected automatically without human intervention.

In its present most highly developed arrangement, the storage area is formed by a plurality of parallel and juxtaposed tracks, formed from adjacent rollers, with axes perpendicular to the direction of the tracks. These rollers are either all motor driven, or mounted free and associated with driving caterpillar tracks disposed laterally along the running tracks.

The flexibility in use of a factory requires very large storage areas. In the above-described present systems the cost of the storage area is directly proportional to this area. The investments required for constructing a large storage area are then very high. Moreover, although they are all motor driven, the rollers are only in use for a very small fraction of time, corresponding to the time for bringing the pile to the chosen position in the area and to the time for transferring it from said position to the handling apparatus. Experience has shown that for 95% of the time, the function of the rollers and the drive function of the motorization device are unused, since the piles of cardboard sheets are at rest.

Moreover, the lateral filling coefficient of said storage area depends on the dimension of the sheets and is only very rarely maximum since the width of the roller alleys and the pitch between driving tracks are chosen, as a rule, at least equal to the maximum opening of the machines supplied. When the piles have a smaller width, the result is a loss of space.

From U.S. Pat. No. 2,711,812 an installation is known for storing objects which partly overcomes this drawback. This installation comprises a plurality of horizontal and parallel beams spaced apart by a constant pitch and resting on supports, so as to define therebetween passage tracks parallel to the beams, and a plurality of mechanized handling vehicles each movable along one of the tracks, and which may be adjusted in height between a low position in which they may be positioned under a load placed on two adjacent beams and a high position in which they lift the load above the beams.

These handling vehicles are equipped with belt conveying means, extending in a direction perpendicular to that of the tracks, which allow the load to be moved transversely from one track to the next, where it is taken over by the handling vehicle associated with said next track.

Moreover, the beams are equipped with belt conveying means which allow the loads which are placed thereon to be moved longitudinally without the help of the handling vehicle.

Such an installation presents the great disadvantage of using as many handling vehicles as there are intervals between beams or tracks. Now, this number is high since the beams must be relatively close together to offer a stable seat for the loads which they support. But, as has already been mentioned, the handling vehicles form a major part in the investment costs of the storage area.

It will be further noted that in such handling vehicles the transverse conveying means which allow a load to be transferred from one track to the next are mechanized over the whole surface of the vehicle. Thus, the transporting belts are motor driven and extend over the whole upper surface of the vehicle. But this entails a consumption of energy greater than that required for moving the load.

In addition, for long loads which rest on more than two beams, several trucks must be positioned under the load so as to support it without risk of deformation or tipping.

Finally, it will be noted that according to this patent the vehicle is brought to its high position by a mechanism which bears on the chassis of the vehicle. This latter must then have a relatively massive structure capable of supporting the stresses exerted by said mechanism.

SUMMARY OF THE INVENTION

The invention aims at overcoming these disadvantages and relates to this end to an installation for storing objects of the type comprising a storage area disposed on at least one level and which is formed at each level by a plurality of horizontal and parallel beams, spaced apart by a constant pitch and resting on supports and at least one mechanized handling vehicle for moving the loads on the beams, characterized in that the supports define under the beams at least one passage track extending perpendicularly to the beams and along which the handling vehicle may move, said vehicle being equipped with means for driving in a transverse direction, perpendicularly to the movement of the vehicle, and being adjustable in height between a low position in which it may may pass freely under the beams and a high position in which the drive means lift the object to be moved.

The invention relates also to a process for storing objects which is characterized in that it comprises:
  in placing the objects astride at least two among a plurality of static horizontal beams, disposed parallel to each other above the ground with constant spacing,
  in using at least one handling vehicle adjustable in height, movable in a longitudinal direction perpendicular to the beams and equipped at its upper part with means for driving in a transverse direction, perpendicular to that of the movement of the handling vehicle,
  in adjusting the vehicle to a low position in which it may pass freely under the beams,
  in moving the vehicle under the beams in said longitudinal direction until it is brought directly below the objects to be transported, in securing it against movement in this position, then
in adjusting the height of the vehicle so that the drive means lift the object above said beams, and
in actuating one or more of said drive means depending on the size of the object so as to move it in said transverse direction, for example towards an edge of the storage area formed by the beams.

The installation and the process of the invention are remarkable by the fact that, up to present, the only solution which has been envisaged by specialists for moving a load placed on parallel beams, by means of a handling vehicle, was to place the vehicle under the load, to bring the vehicle into a high position and to move the vehicle and load assembly parallel to the beams. This is the solution which has been chosen in particular in U.S. Pat. No. 2,711,812. The disadvantages of this solution have already been outlined above. The invention, on the contrary, runs counter to this idea by recommending, in a surprising way, moving the handling vehicle perpendicularly to the beams.

One advantage of the installation of the invention is that the handling vehicle may be given a width slightly less than that of the passage track defined between two rows of supports. It will then be readily understood that the installation of the invention uses an extremely reduced number of handling vehicles.

Another advantage of the process of the invention resides in the fact that it only requires the storage zone concerned at a given moment to be mechanized, contrary to conventional processes in which all the storage zones are mechanized. This results therefore in greatly reduced investment costs with respect to those of the traditional storage process. The reduction in cost is all the greater the larger the storage area; it may reach 50% in most of the installations for cardboard factories.

On the other hand, the filling coefficient of the storage area may be greatly improved by adopting a between beam pitch which is less than the size of the smallest object to be stored.

With this device, the space lost between objects will be at most equal to the free interval between beams and no longer to the difference between the real width of the object and the width of the storage alley along which the object is positioned.

Because of its three degrees of freedom (in the longitudinal direction, in the transverse direction and in height), the vehicle may carry out all loading, transfer and unloading operations of objects placed in any position in the storage area.

For storage areas of small depth, one-piece beams may be used placed at their ends on supports, such as pillars, defining the lateral boundaries of the track for passage of the vehicle. Advantageously, the vehicle has a width close to that of said track so that, without having to move transversely, it may take over an object placed at any point along the beams.

On the other hand, if the storage area is too deep, the use of beams having a length equal to the width of the area and which rest only at their ends on supports is out of the question because of the deformation in their central part which is too great.

According to the invention, long beams may be used in this case bearing at several evenly spaced points along their length on pillars.

In another embodiment, short beams may be used placed end to end so as to obtain the width of the storage area, the adjacent ends of the beams bearing on the same pillar.

This second embodiment is perferable, for the beams are lighter and may therefore be easily lifted for freeing the drive means should these latter be jammed following incorrect positioning of the vehicle under the object.

In these two embodiments, longitudinal passage tracks extending perpendicularly to the beams are defined between the pillars. It is obvious that a handling vehicle cannot alone serve all the passage tracks since it would be hindered by the pillars when passing from one track to another. This is why, in this case, as many handling vehicles are used as there are passage tracks, each vehicle having its own longitudinal movement along its track. To transport an object, it is necessary to cause all the vehicles to occupy side by side positions along a transverse line passing through the object to be transported. The object is then transferred transversely from one vehicle to the next by the drive means of these latter.

In a particular embodiment, the handling vehicle comprises a motorized translation chassis, mounted on wheels, and having a general rectangular shape whose transverse dimension with respect to the direction of movement of the vehicle is substantially less than the width of the passage track of the vehicle between the pillars supporting the beams, a rectangular lifting cradle resting on said chassis and equipped at its four corners with jacks adapted to bear on the ground for raising the cradle above the chassis, when the vehicle is stopped, and a plurality of elongate carrying sections, fixed to the cradle and comprising drive means, such as rollers and/or transport belts, said sections having a length substantially equal to said transverse dimension of the vehicle, a width slightly less than the interval between two successive beams and a height above the cradle such that, when this latter is in the high position, the rollers and/or transport belts project above the upper face of the beams.

The role of the chassis is:

to support the lifting cradle and the carrying sections which are secured thereto when this assembly is in the low position;

to move this assembly perpendicularly to the beams and to bring it under the loads to be handled;

to support the cabinet receiving the assembly of electric and electronic control apparatus (contactors, sensors, programmable automatons, etc.);

to support the electric and electronic devices providing the connection between the fixed points of the installation and the handling vehicle.

The lifting cradle serves:

for supporting and providing connection of the carrier sections;

for raising these latter to a level higher than the one formed by the support plane of the beams;

for providing with the chassis a connection which allows the relative vertical movement between cradle and lifting chassis.

For supporting and transferring the chassis, it comprises two wheel trains for running over running tracks laid on the ground, one of the two trains being actuated by a motordriven reducer.

Advantageously, these wheels will include tires with a material providing a good grip on the running track, so as to allow rapid acceleration when starting up and to provide accurate positioning when the device is stopped.

The movement of the jacks is controlled by motors through transmission shafts and bevel gear assemblies. Hydraulic or pneumatic jacks should be avoided because the handling vehicle would have to drag along with it fluid supply pipes or would have to carry a pneumatic or hydraulic unit for pressurizing the fluid.

The vertical movement connection of the cradle with respect to the chassis is provided by the combination of four channel bars fixed vertically to the corners of the chassis and four rollers with horizontal axes fixed to the corners of the lifting cradle and which are mounted for running inside the channels or else by ball sockets with rectilinear movement fixed to the cradle and guided by uprights secured to the chassis.

The storage may, in accordance with the invention, comprise two or more superimposed levels of beams defining two or more floors each comprising several passage tracks in which handling vehicles move.

Guidance of the handling vehicle in its longitudinal movement could be provided conventionally by means of guide rails laid on the ground, but the laying of such rails implies long and costly work for preparing the ground.

This is why the invention proposes a much more economical guidance system, which comprises two longitudinal guides fixed to the pillars on each side of the passage track of the vehicle, and at least four rollers fixed to the two lateral faces of the chassis for running between said guides.

In one embodiment, guidance of the vehicle is provided by the combination of a single longitudinal guide, having an inverted U section, fixed to the pillars on only one side of the passage track of the vehicle and two rollers fixed to the same side of the chassis for running inside the guide.

BRIEF DESCRIPTION OF THE DRAWINGS

A preferred embodiment of the invention will be now be described, by way of non limiting example, with reference to the accompanying drawings in which.

DETAILED DESCRIPTION OF THE PREFERRED EMBODIMENTS

Figure 1:
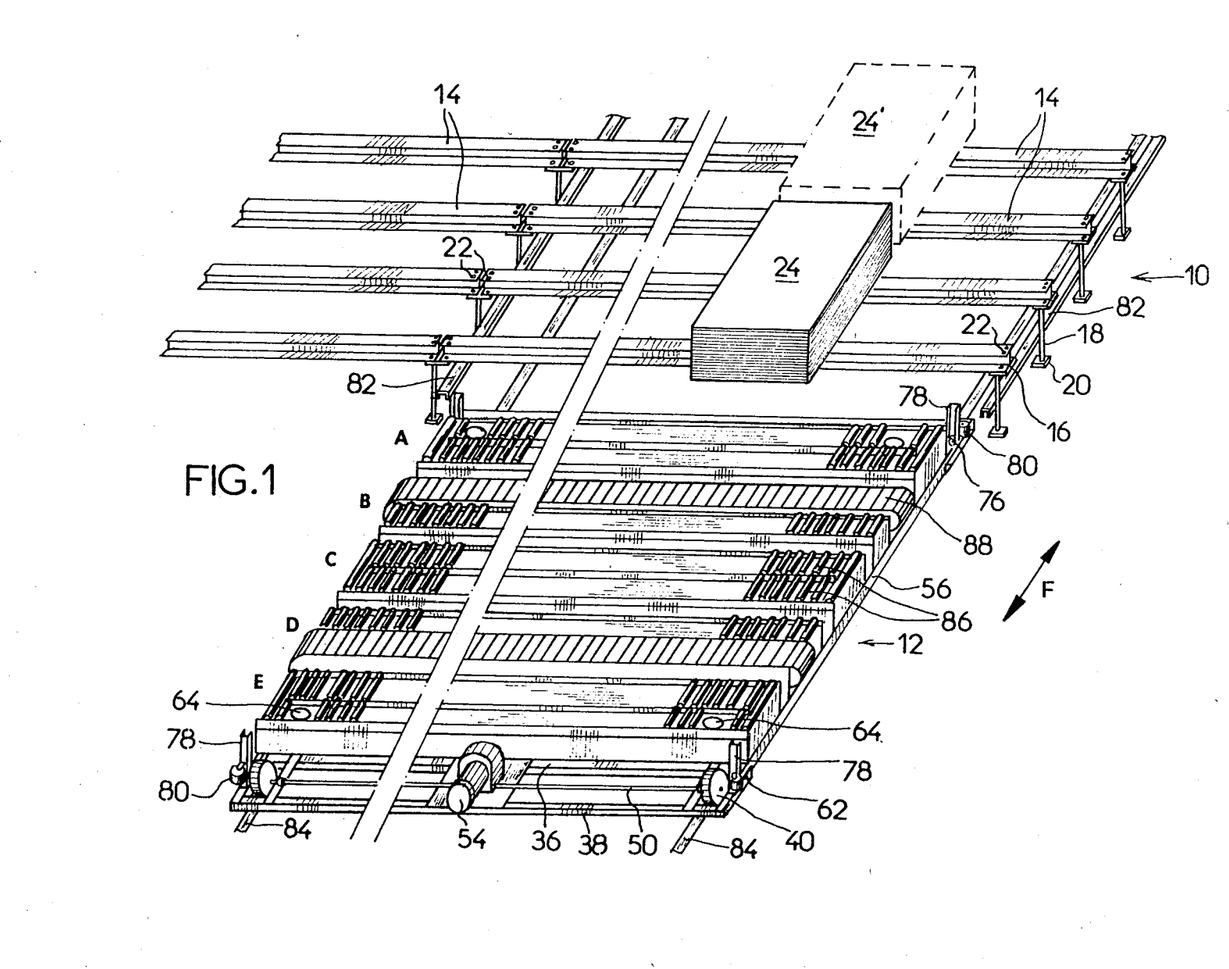
FIG. 1 is a partial perspective view of the storage area and a handling vehicle in accordance with the invention.
Figure 2:
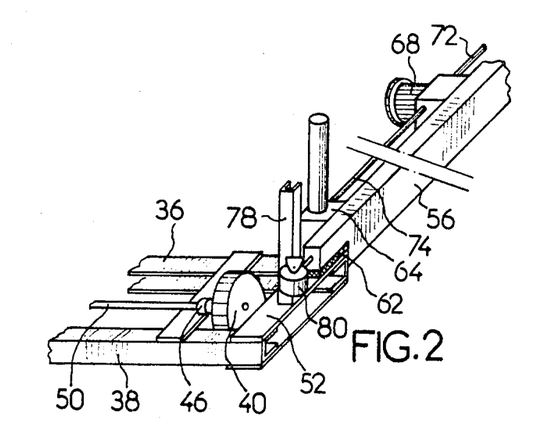
FIG. 2 is a perspective view of a detail of FIG. 1, the carrier sections being assumed raised so as to show certain details of the chassis and of the lifting cradle.
Figure 3:
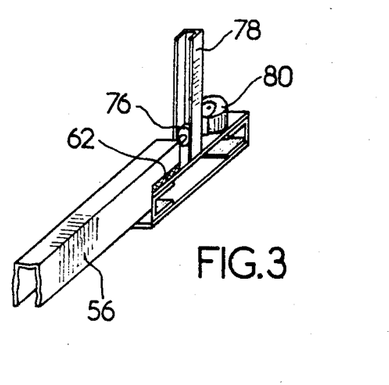
FIG. 3 is a perspective view of another detail of FIG. 1.

The invention will be described in the particular case of the storage of piles of corrugated cardboard sheets for manufacturing packings, the description remaining of course valid in the case of storing, various other objects;

With reference to FIG. 1, the storage installation of the invention comprises a storage area 10 and several handling vehicles 12 only one of which is shown.

The storage area is generally situated at the output of the corrugating machine. It is formed of a plurality of metal beams 14, preferably with I section, disposed parallel to each other in the same horizontal plane and with constant spacing. The beams rest at their ends on large bases 16 formed at the upper end of aligned pillars 18 which rest on the ground through bases 20.

The piles of cardboard 24 are placed on at least two adjacent beams. To prevent the pile from bending in its unsupported central part, spacing between beams should be less than a critical distance, which depends on the qualtiy of the cardboard and on its specific weight. For lower quality carboard with small grooves, and with grooves orientated parallel to the beams, this distance is of the order of 40 cm.

Similarly, the maximum length of the beams between supports will depend on the loads transferred to each beam and on their moment of inertia, so as to avoid excessive deformation. In practice, beams will be used of 4 to 5 m in length.

Figure 4:
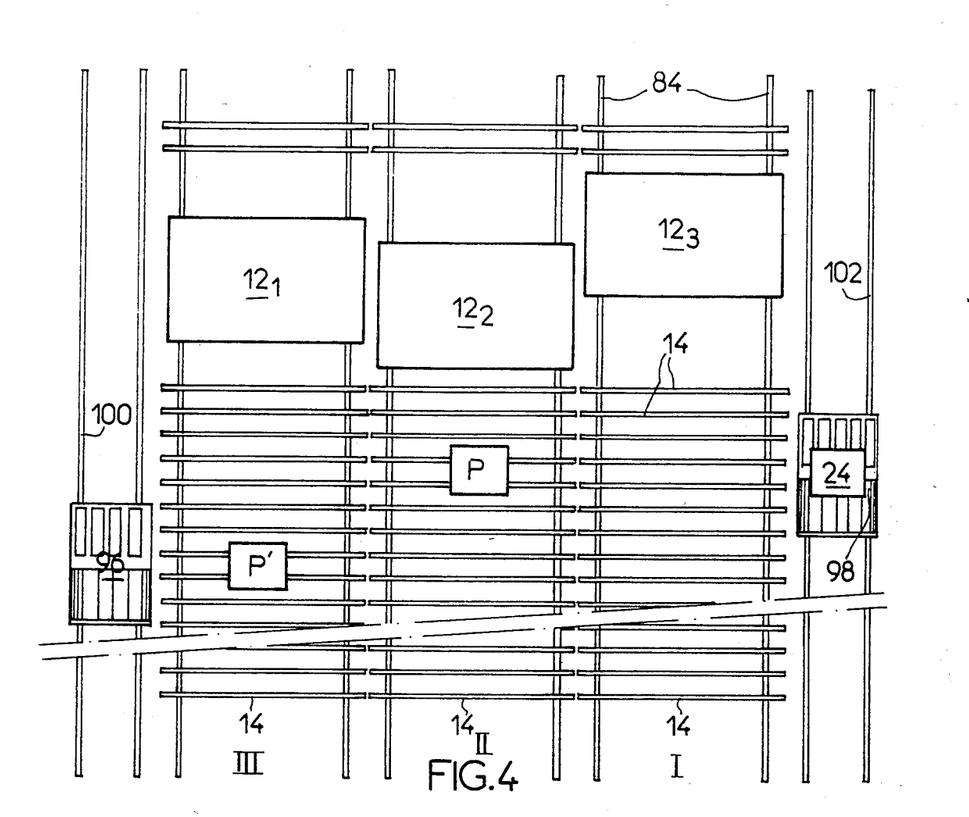
FIG. 4 is a top view of a three track storage area.

To form a deeper storage area, either long beams may be used resting on intermediate pillars, defining reaches less than a critical length or, preferably, as many beams of unitary length may be disposed end to end as is needed to obtain the desired value. FIGS. 1 and 4 illustrate this last possibility, in the case where three beams are juxtaposed in each line. The adjacent ends of two contiguous beams rest on the same pillar.

For fixing the beams, they are provided at their ends, on the four flanges of the I, with holes 22 for receiving studs projecting from bases 16.

The height of the pillars is chosen substantially equal to that of the machines for manufacturing and treating the cardboard, so as not to change the level of the piles.

The handling vehicle 12 is capable of moving independently and perpendicularly to the direction of the beams 14 in one of the passage tracks formed under the beams between the pillar alignments 18. In the case of FIGS. 1 and 4 where there are three passage tracks, three handling vehicles $12_1$, $12_2$ and $12_3$ will be used each serving one passage track, as will be explained further on.

Figure 5:
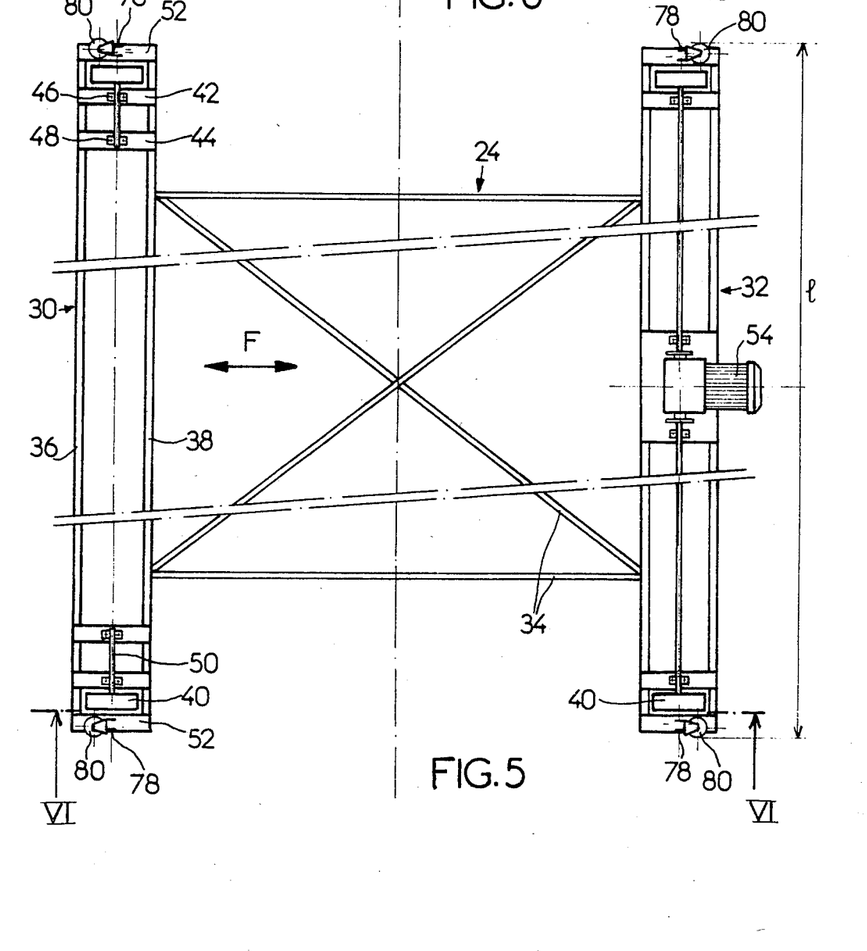
FIG. 5 is a top view of the translation chassis of the handling vehicle.
Figure 6:
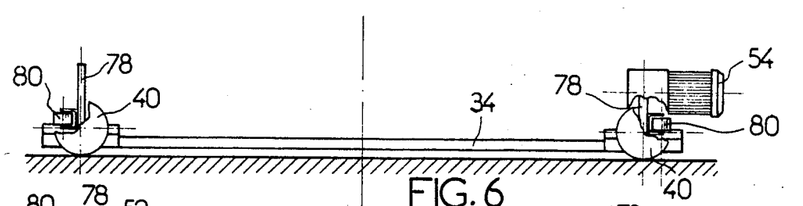
FIG. 6 is a sectional view along line VI—VI of FIG. 5.

Each handling vehicle 12 comprises a translation chassis 24 (FIGS. 5 and 6), a lifting cradle 26 (FIGS. 7 and 8) resting on the chassis and carrier sections 28 (FIGS. 9 and 10) formed by roller tables and/or transporter chains fixed to the cradle.

The translation chassis 24 comprises two running trains 30 and 32 connected together by bracers 34. Each of these trains is formed by a protecting frame of light structure comprising for example two elongate shaped sections 36,38 disposed in front and behind the wheels 40 and which are connected together by internal cross-pieces 42,44 which carry the bearings 46,48 of the shafts 50 of the wheels and by external cross-pieces 52 intended to serve as a support for the cradle, as will be explained further on. On the shaped section 36,38 of one of the wheel trains is fixed a motor driven reducing unit 54 for driving the wheels of said train. The lifting cradle (FIGS. 7 and 8) is formed by two longitudinal and parallel beams 56,58 having a high moment of inertia which provide the longitudinal rigidity of the assembly. They are connected together by two lighter bracers 60, the transverse rigidity being obtained when the carrier sections 28 are fixed to beams 56, 58.

Figure 7:
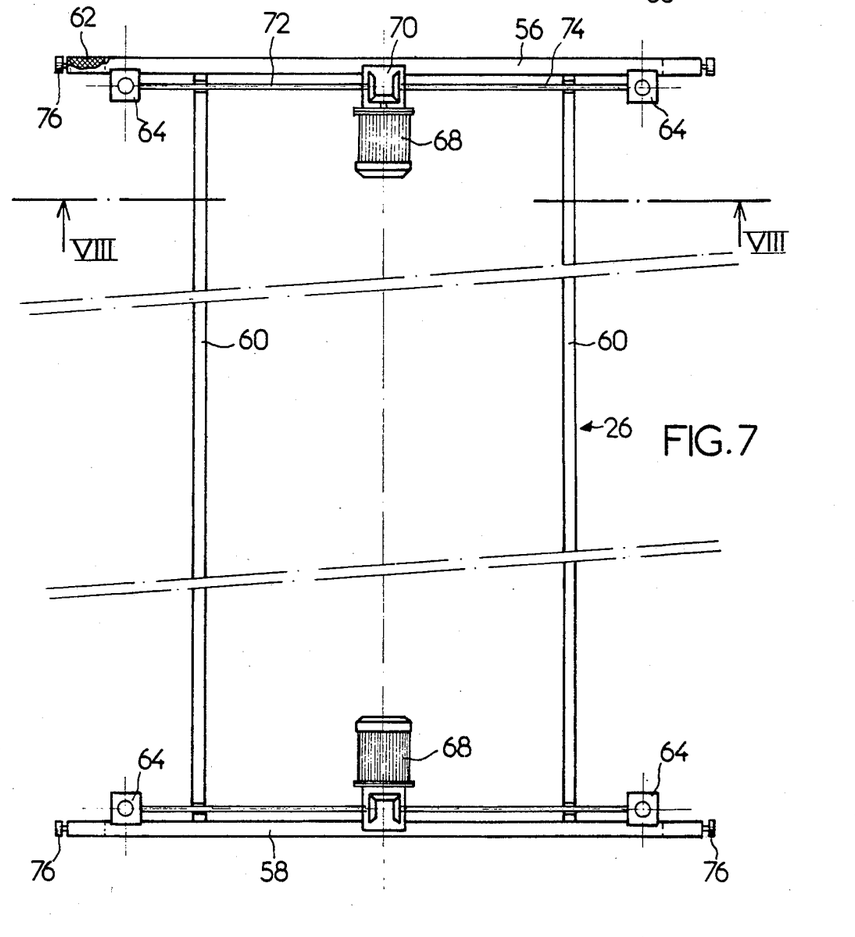
FIG. 7 is a top view of the lifting cradle of the handling vehicle.
Figure 8:
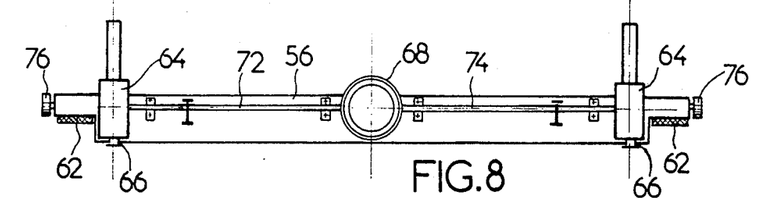
FIG. 8 is a sectional view along line VIII—VIII of FIG. 7.

The shaped section 56,58 are provided at their ends with studs 62 made from a resilient material, for example rubber, through which the cradle rests on the external cross-pieces 52 of the chassis.

The lifting cradle may be raised above the chassis by means of four jacks 64, preferably of the screw type, each comprising a casing fixed to the shaped section 56,58 and a screw 66 which, when it is extended, bears directly on the ground. The jacks are advantageously fixed in the vicinity of the ends of the shaped sections 56,58 so that the bearing points on the ground are spaced as widely apart as possible so as to provide the best stability for the cradle. Each pair of jacks associated with one of the shaped sections 56, 58 is controlled from a motor-driven reducing unit 68 through a bevel gear assembly 70 and transmission shafts 72,74 which transmit the rotational movement of the shaft of the unit to the shafts 66 of the jacks.

Figure 7A:
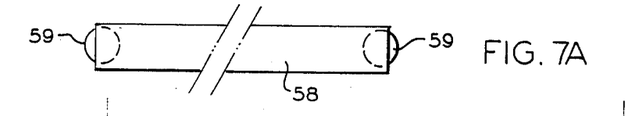
FIG. 7A shows a portion of an alternate lifting cradle.

The cradle is guided in its vertical movement by any appropriate guide means, one particular embodiment of which will be described hereafter by way of example. Guiding is provided by the cooperation of rollers 76 (FIGS. 1,3, 7 and 8) having horizontal axes, fixed to the ends of the shaped sections 56,58 of the cradle and capable of running inside the channel section 78 (FIGS. 1,3,5 and 6) fixed vertically to the external cross-pieces 52 of the chassis. Alternately, with reference to FIG. 7A, the cradle may be guided by guide balls 79 secured in ends of the shaped sections 56, 58 and which, in use, run inside channel sections 78.

The handling vehicle 12 is movable longitudinally in the direction of the double arrow F (FIG. 1) which is perpendicular to the beams 14 and is guided for movement in one of the tracks defined under these latter, between two consecutive rows of pillars, by any appropriate guide means. The guide means which are shown in FIGS. 1,2,3,5 and 6 by way of example comprise, on the one hand, at least four rollers 80 with vertical axes, fixed for example to the sections 78 and partially projecting from the lateral walls of the vehicle, formed by the longitudinal shaped section 56,58 and, on the other hand, two longitudinal guides 82 with an inverted U section which are fixed by one of their flanges to the pillars 18 on each side of the passage track of the vehicle; rollers 80 running over the internal flanges of the guides. Correct guidance is obtained by giving the vehicle a width 1 as close as possible to the interval between the internal flanges of the two guides 82.

Another advantageous means for obtaining bilateral guidance would be to use only two rollers situated on the same side of the chassis and moving inside an inverted U shaped section.

It will be noted that the guides may serve for housing the electrical supply cables and connections of the vehicle.

The vehicle moves over two running strips 84 laid on the ground. These running strips also serve as supports for the screws 66 of the mechanical jacks 64, thus playing a role of load distributor.

Figure 9:
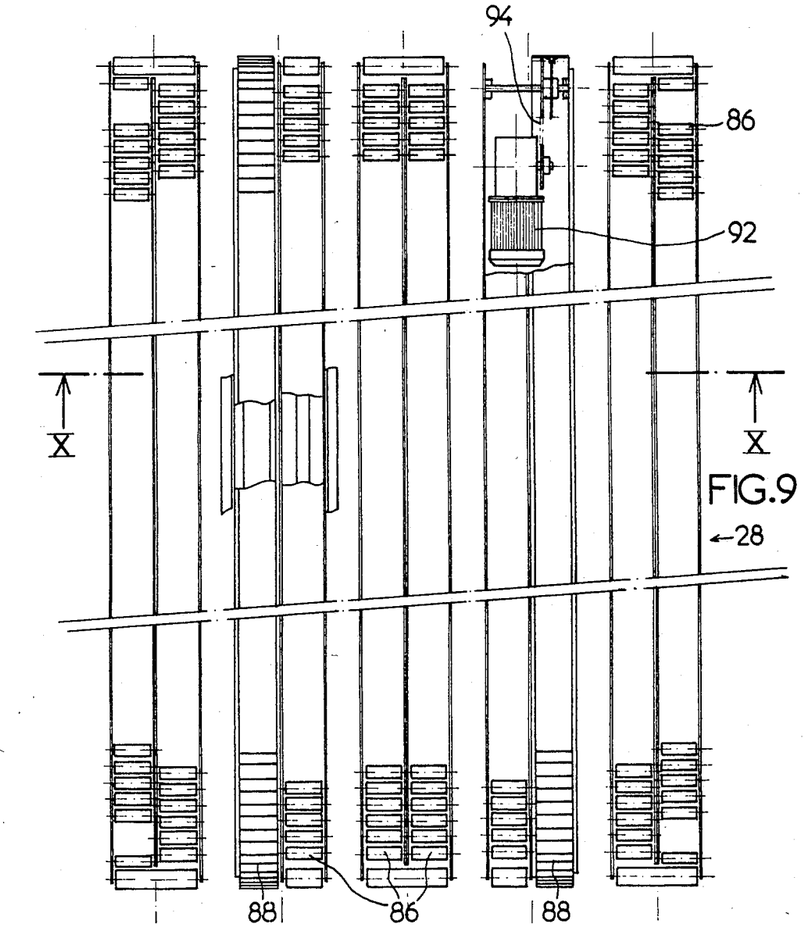
FIG. 9 is a top view of the carrier sections.
Figure 10:
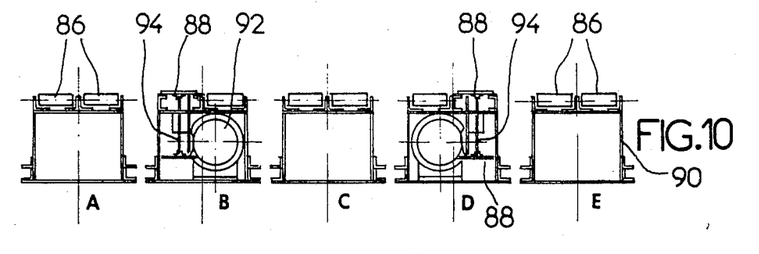
FIG. 10 is a sectional view along line X—X of FIG. 9.
Figure 11:
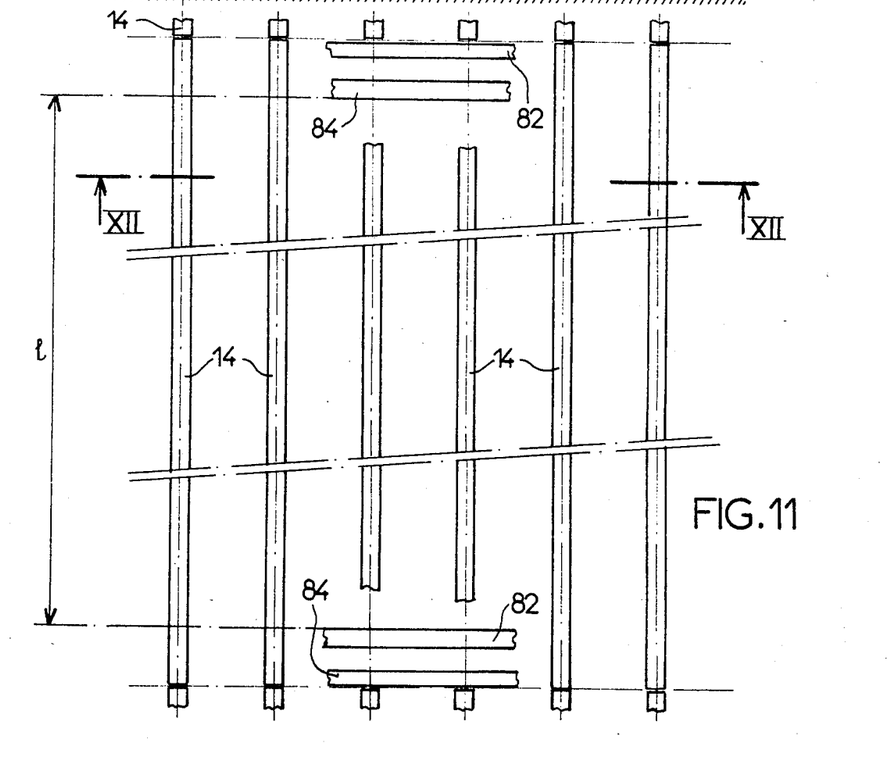
FIG. 11 is a partial top view of the storage area.
Figure 12:
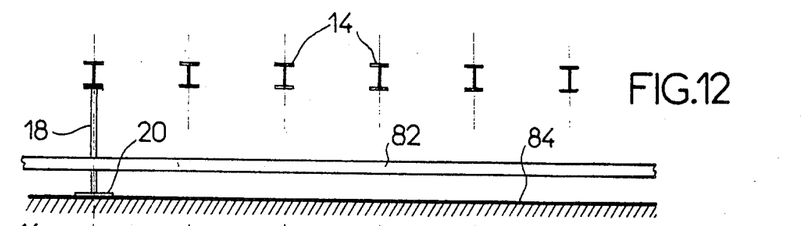
FIG. 12 is a sectional view along line XII—XII of FIG. 11.

The handling vehicle may comprise several carrier sections 28, for example five, A,B,C,D and E, in the case of FIGS. 1,9 and 10.

Each carrier section comprises an elongate caisson 90 fixed to the shaped sections 56,58 of the cradle (FIGS. 7, 8), in the transverse direction with respect to the direction of movement of the vehicle. On the upper face of the caisson are fixed drive means, formed for example by non mechanized roller paths 86 and/or by mechanized transporting belts 88.

The sections have a width slightly less than the interval between the beams 14 so as to be able to pass therebetween when the cradle is brought to its high position.

Each section may comprise a single roller path or a single transporter belt but experience shows that it is preferable to dispose side by side in the same caisson either two roller paths 86, of a width equal to half the width of the section, or one roller path 86 and a transporter belt 88. With such an arrangement, in fact, in the case of two piles of cardboard 24 and 24' disposed side by side as in FIG. 1, one of the piles may be moved without touching the other. If on the contrary the sections comprise a single roller path or a single transporter belt occupying the whole width of the section, they would risk moving the two piles at the same time.

Figure 13:
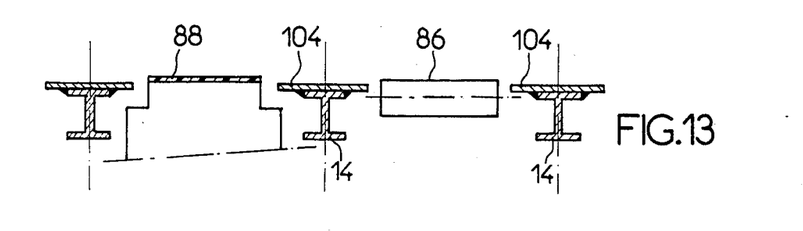
FIG. 13 is a partial sectional view of the storage installation according to a variant.

So as to reduce deformation of the piles of cardboard on the beams, the bearing surface for the piles may be increased, as shown in FIG. 13, by fixing a rigid plate 104 of greater width, for example double that of the beam, flat on the upper surface of each beam. The plate extends on each side beyond the beam so that the unsupported portion of the piles is substantially reduced. Thus, the width of the carrier sections is also reduced. These latter may then each comprise only a single roller path 86 or a single transporter belt 88.

Experience shows that piles of cardboard disposed on the beams in any arrangement may be moved if the carrier sections A,C and E each comprise two roller paths 86 and if sections B and D each comprise, on the inside a roller path 86 and, on the outside, a transporter belt 88.

Each transporter belt is driven by a motor-driven reducing unit 92 housed inside the caisson 90 through chain and pinion transmission assembly 94.

Of course, the total height of the handling vehicle, when it is in its low position, must be less than the free height under the beams, so that the vehicle may travel freely under the beams.

Two carriages 96,98 are provided for bringing the piles of cardboard 24 from the service area of the corrugating machine to the storage area. These carriages run, on each side of the storage area 10, over longitudinal paths 102, 104 perpendicular to the beams 14 (FIG. 4). The upper part of these carriages is equipped with motorized roller paths or with transporter belts so as to allow loads to be moved perpendicularly to the direction of movement of the carriage.

Figure 14:
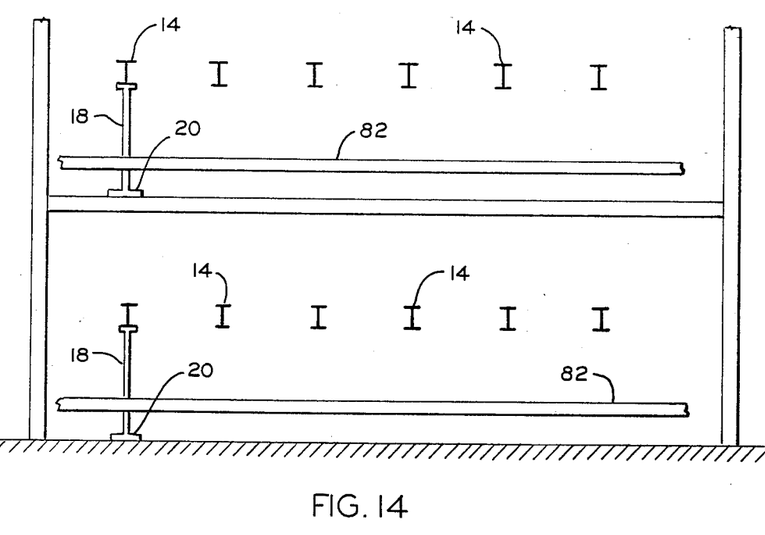
FIG. 14 is a side view of a two level storage installation.
Figure 15:
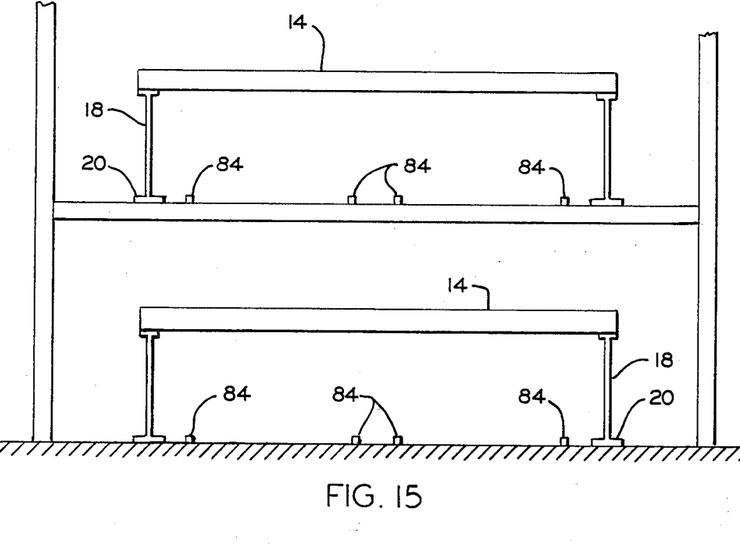
FIG. 15 is a front view of the storage area shown in FIG. 14.

Advantageously, the movements in length and in height of the vehicles and of the carriages, and the operation of the transporter belts and of the carriages are controlled and synchronized automatically, for example by computer. As shown in FIGS. 14 and 15, the storage area of the present invention may comprise a plurality of levels, each level including a plurality of beams and a plurality of passage tracks.

To show the flexibility of the storage installation of the invention, a few examples will now be described with reference to FIGS. 1 to 4.

To place pile 24 for example at position P in the storage area, carriage 98 is caused to move which carries the pile until this latter is centered on two adjacent beams 14 on which it is to be placed. At the same time, a first signal controls the movement of the handling vehicles $12_3$ and $12_2$ initially in the low position, until they are brought into alignment with carriage 98. The vehicles are then exactly positioned so that their sections are opposite intervals between successive beams.

The computer will have programmed the stopping position of vehicles $12_3$ and $12_2$ so that one of the two transporter belts 88 is substantially centered on pile 24 or, if the pile is of greater width, so that the two transporter belts 88 may be in contact with the pile.

A second control signal is then fed to the motor-driven reducers 68 (FIGS. 2, 7 and 8), which causes jacks 64 to extend. The screws 66 of these latter come into abutment against the running strips 84, then raising the cradle and the carrier sections. These latter pass through the spaces between the beams and project above the upper surface thereof. Carriage 98 and the carrier sections of handling vehicles $12_3$ and $12_2$ then form a practically uninterrupted transport surface.

A third control signal then causes actuation of motors 92 for driving the transporter belts 88 concerned as well as the motor for laterally moving the load off carriage 98. The pile 24 is then transferred from carriage 98 to the chosen position P. At that moment, a fourth signal stops operation of motors 92 and controls the lowering of the vehicles. Pile 24 is then placed exactly in position P.

It will be noted that in each of carriages $12_3$ and $12_2$ only a single transporter belt 88 is used: the one opposite the load 24 placed on carriage 98, except in the case where the width of the load is such that this latter is in contact with the two belts. Furthermore, it is not necessary for the middle of the pile to rest exactly on a belt 88 to be driven. Good driving can still be obtained if belt 88 is in contact with the pile in a zone going from the first quarter to the third quarter of the width thereof, the rest of the pile resting on rollers 86.

If it is now desired to move the pile from position P to another position P', vehicle $12_2$ is first of all brought under the position P and vehicle $12_1$ under position P', then said vehicles are raised. The transporter belts 88 of these latter which are in the extension of each other are then brought into service, so that the pile is transferred.

It will be noted that the use of several carriages in FIG. 4 makes the incoming and outgoing operations in the storage area independent. In fact, it is possible to introduce loads into the storage area by aligning vehicle $12_3$ and carriage 98 and, at the same time, to withdraw loads from the storage area by aligning vehicle $12_1$ and carriage 96.

Load transfers from zone I to zone II and from zone II to zone III may take place while carriage 98 is being loaded outside the storage zone or while carriage 96 is bringing the load to the user station.

I claim:

1. An installation for storing objects comprising:
    a storage area having at least one level including a plurality of horizontal and parallel, transversely extending beams spaced apart a uniform distance, and means supporting the beams;
    a passage track longitudinally extending directly beneath the beams;
    a mechanized handling vehicle for moving loads along the beams and supported on the passage track for movement therealong to positions directly beneath the beams, the handling vehicle including
        (i) a motorized chassis supported on the passage track,
        (ii) a lifting cradle resting on the chassis and having a low position, wherein the cradle passes freely under the beams, and a high position for lifting a load off the beams, and
        (iii) load carrier means connected to the cradle and supported thereby for movement relative to the cradle to engage the load and carry the load in the transverse direction along the cradle and the beams.

2. An installation according to claim 1 wherein the beam support means includes a plurality of pillars defining transverse boundaries of the passage track.

3. An installation according to claim 1 wherein:
    each beam consists of a single, continuous bar extending across the storage area; and
    the beam support means includes
        (i) a first group of pillars supporting ends of the bars, and
        (ii) a second group of pillars supporting intermediate portions of the bars.

4. An installation according to claim 1 wherein:
    each beam includes a plurality of individual beam sections positioned end to end to extend across the storage area;
    the beam support means includes a plurality of pillars supporting ends of the beam sections; and adjacent ends of transversely adjacent beam sections rest on the same pillar.

5. An installation according to claims 1, 2, 3 or 4 wherein:
    the beam support means includes a plurality of pillars having upper ends forming beam support bases;
    each beam includes an I-section bar having first and second ends resting on the beam support bases; and
    the beam support means further includes a plurality of studs connecting the I-section bars to the pillars.

6. An installation according to claims 1, 2, 3 or 4 further comprising a plurality of rigid support plates secured to tops of the beam and having widths greater than that of the beams.

7. An installation according to claim 1 wherein:
    the passage track has a predetermined width;
    the motorized chassis includes
        (i) a chassis frame having a generally rectangular shape with a width substantially less than the width of the passage track, and
        (ii) a plurality of wheels supporting the chassis frame for longitudinal movement along the passage track;
    the lifting cradle includes a cradle frame and a plurality of screw jacks connected to the cradle frame to move the lifting cradle between the low and high positions;
    the load carrier means includes a plurality of carrier sections having lengths substantially equal to the length of the mechanized handling vehicle, and widths less than the space between adjacent beams;

each carrier section includes drive means to move the load along the carrier means; and the carrier sections pass freely under the beams when the lifting cradle is in the low position, and project above the beams when the lifting cradle is in the high position.

8. An installation according to claim 7 wherein:

the chassis frame includes a pair of spaced wheel trains, and a brace connecting the wheel trains together;

the passage track includes a pair of parallel running strips;

the chassis wheels are supported by the running strips and are connected to the wheel trains of the chassis frame and support the running trains for movement along the running strips; and the chassis further includes motor means to drive the chassis wheels and move the chassis along the running strips.

9. An installation according to claim 8 wherein the chassis wheels include tires made from a material providing a good frictional engagement with the running strips.

10. An installation according to claims 8 or 9 wherein:

each wheel train includes
(i) elongated front and rear sections,
(ii) internal cross pieces connecting the front and rear sections together,
(iii) external cross pieces further connecting together the front and rear sections, and
(iv) wheel shafts supported by the internal cross pieces and supporting the chassis wheels;

a pair of wheels are connected to each wheel train, between the front and rear sections thereof; and the lifting cradle rests on the external cross pieces of the wheel trains.

11. An installation according to claims 7, 8 or 9 wherein the lifting cradle includes a pair of elongated cradle sections, each cradle section having a pair of ends resting on the motorized chassis adjacent the wheels thereof.

12. An installation according to claim 11 wherein the screw jacks are secured to the cradle sections of the lifting cradle adjacent the ends of said cradle sections; and the lifting cradle further includes
(i) motor means to selectively extend and retract the screw jacks, and
(ii) transmission shafts connecting the motor means to the lifting cradle to the screw jacks.

13. An installation according to claims 7 or 8 or 9 wherein the motorized chassis includes means to guide vertical movement of the lifting cradle.

14. An installation according to claim 13 wherein:

the chassis frame has four corners;

the guide means includes four channel sections, each channel section being secured to a different corner of the chassis frame and vertically extending upward therefrom;

the lifting cradle includes four rollers supported for rotation about horizontal axes, each roller extending into a different channel section to guide vertical movement of the lifting cradle.

15. An installation according to claims 13 wherein:

the guide means includes a plurality of vertical guides secured to the chassis and extending upward therefrom; and the lifting cradle includes a plurality of guide balls to guide vertical movement of the lifting cradle along the vertical guides of the chassis.

16. An installation according to claims 7, 8 or 9 wherein:

the installation further comprises a longitudinal guide secured to the beam support means and extending along the passage track;

the handling vehicle further includes a plurality of guide rollers supported for rotation about vertical axes and located closely adjacent the longitudinal guide to guide movement of the handling vehicle along the passage track.

17. An installation according to claim 16 wherein:

the longitudinal guide includes a u-shaped bar; and the guide rollers of the handling vehicle extend within the u-shaped bar.

18. An installation according to claim 16 wherein:

the longitudinal guide consists of a single u-shaped bar; and the guide rollers of the handling vehicle consists of a pair of rollers extending within the u-shaped bar.

19. An installation according to claims 1, 2 or 3 wherein:

the storage area has a plurality of levels, each level including a plurality of beams and a plurality of passage tracks; and the installation includes a plurality of mechanized handling devices supported by the passage tracks for moving loads along the beams.

20. A process for moving a load in a storage installation of the type having at least one level including a plurality of horizontal and parallel beams spaced apart a uniform distance, and a mechanized handling vehicle having a lifting cradle and load carrier means secured to the top of the lifting cradle, the method comprising the steps of:

placing the load astride at least two of the beams;

moving the load handling vehicle longitudinally with respect to the storage installation, to a position directly below the load;

securing the load handling vehicle in position;

raising the lifting cradle to engage the load with the load carrier means and to raise the load off the beams; and activating the load carrier means to carry the load transversely with respect to the storage installation, along the handling vehicle and the beams.

21. A process according to claim 20 wherein the installation has a pair of mechanized handling vehicles, each vehicle having a lifting cradle and load carrier means secured to the top thereof, and wherein:

the moving step includes the step of transversely aligning the two handling vehicles;

the raising step includes the step of raising the lifting cradles of both handling vehicles to form a substantially continuous driving surface with the carrier means of the vehicles; and the activating step includes the step of transferring the load from one of the vehicles to the other vehicle.

22. An installation for storing objects comprising:

a storage area having at least one level including a plurality of horizontal and parallel, transversely extending beams spaced apart a uniform distance, and means supporting the beams;

a passage track longitudinally extending beneath the beams;

a mechanized handling vehicle supported on the passage track for longitudinal movement therealong, the handling vehicle having a low position, wherein the handling vehicle passes fully under the beam, and a high position for lifting a load off the beam;

the handling vehicle including drive means for engaging and transversely moving the load;

wherein the beam support means includes a plurality of pillars supporting ends of the beams and defining transverse boundaries of the passage track.

23. An installation according to claim 22 wherein:

each beam includes an I-section bar having first and second ends resting on the pillars; and the beam support means further includes a plurality of studs connecting the I-section bars to the pillars.

* * * * *